June 26, 1923.
E. J. BROCK
WATER PURIFIER
Filed July 25, 1919
1,459,820
2 Sheets-Sheet 1
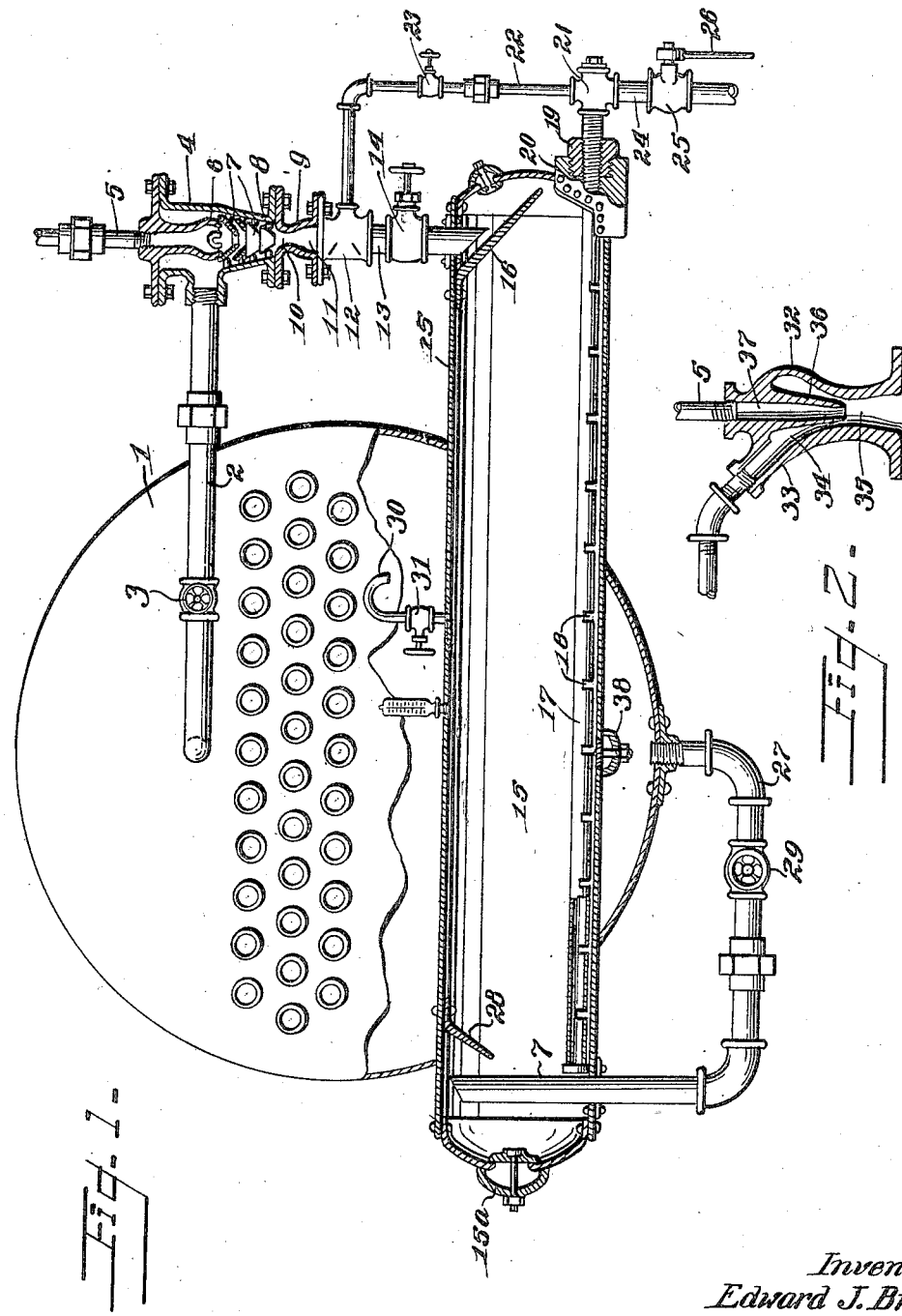
Inventor:
Edward J. Brock.
by Elliott & Ammen
his Attys

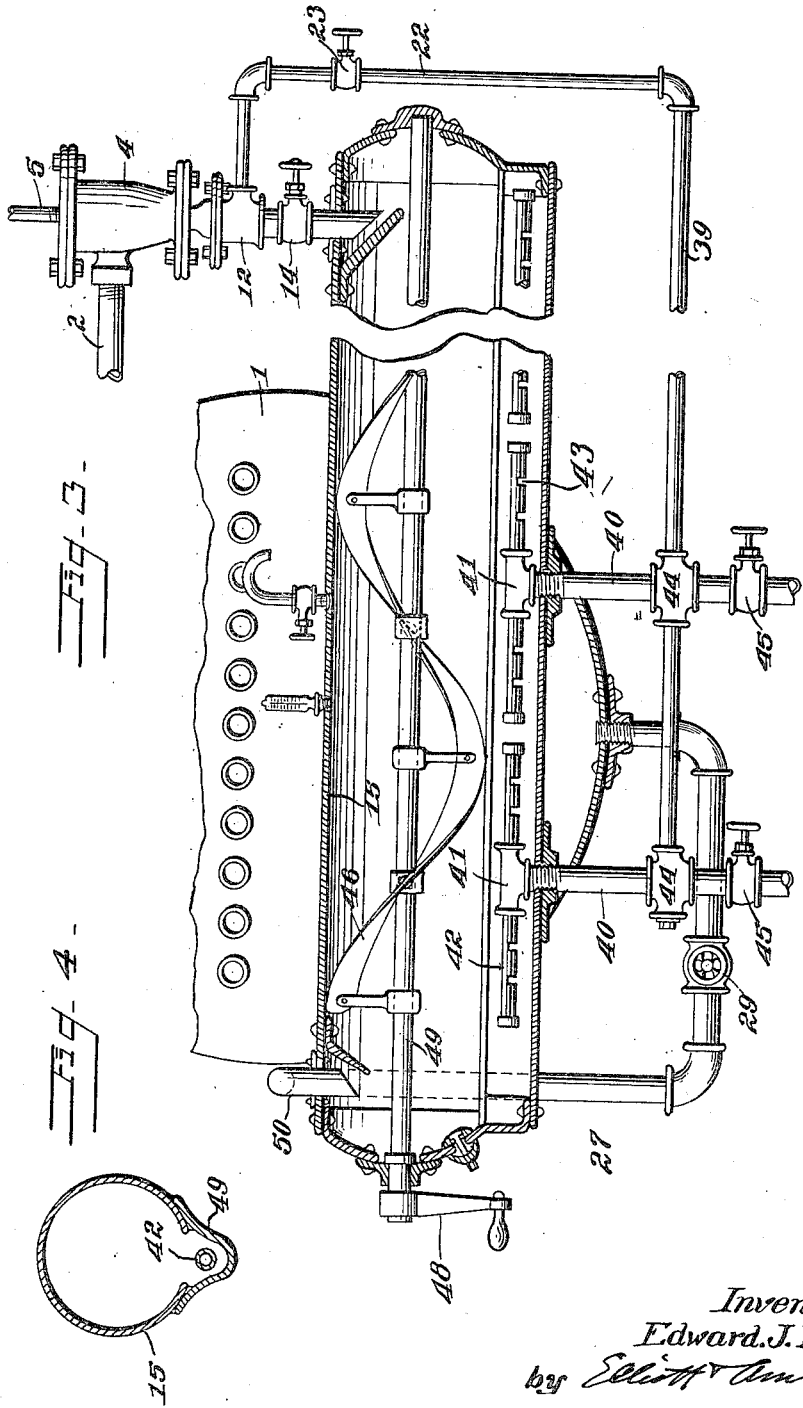

Patented June 26, 1923.

1,459,820

UNITED STATES PATENT OFFICE.

EDWARD J. BROCK, OF ST. LOUIS, MISSOURI.

WATER PURIFIER.

Application filed July 25, 1919. Serial No. 313,352.

*To all whom it may concern:*

Be it known that I, EDWARD J. BROCK, a citizen of the United States, residing in the city of St. Louis and State of Missouri, have invented new and useful Improvements in Water Purifiers, of which the following is a specification.

This invention relates to water purifiers of the type in which impurities are caused to be removed from the water by a process of precipitation and has for its general object the provision of novel apparatus for accomplishing such purpose.

The invention has for its further object the provision of means for removing deposits from the walls of the precipitating tank.

Still further objects of the invention relate to details of construction and to combinations and operations of parts, all of which will be more clearly understood from the description of the invention to follow.

In the accompanying drawings;

Figure 1 is a view partly in section and partly in elevation showing the construction of one form of my improved water purifying apparatus, and its connection with a boiler.

Figure 2 illustrates a modified construction of the device for mixing the incoming feed water with the hot water from the boiler;

Figure 3 is a view similar to Figure 1 showing a modified arrangement of apparatus, and also showing a rotary scraping device as applied to the purifying tank; and, Figure 4 is a cross section through the purifying tank of Figure 3, but on a smaller scale.

Referring now to these drawings, and particularly to Figure 1, the numeral 1 indicates a steam boiler of any preferred type to which is connected, below the water level, a pipe 2 provided with a valve 3. The pipe 2 is connected to a mixing chamber 4 into the top of which leads a feed-water pipe 5. The pipe 5 leads from an injector or feed pump and is connected to the outer end of a nozzle 6 having an annular opening in its lower end, which is located immediately over and slightly within the upper end of the uppermost of a series of hollow cone-shaped members 7, which are nested in spaced relation and suitably supported by projections 8, or otherwise, on the wall of the chamber 4. The nozzle 6 and cup-shaped devices 7, when the feed-water is supplied through the pipe 5, under pressure, as usual, act as an injector to draw hot water into the mixing chamber through the pipe 2 into the boiler and to thoroughly mix such hot water with the incoming cold water. On the bottom of the mixing chamber is secured a casting 9 affording a throat 10 which widens toward the bottom of the casting as indicated at 11, and on the bottom of the casting 9 is secured a coupling 12 in the under side of which is connected the upper end of a pipe 13 which is provided with a valve 14. The lower end of the pipe 13, beyond the valve 14, enters the upper side of a horizontally disposed settling tank or purifying tank 15. At one end of said tank, immediately under the lower end of the pipe 13, is mounted an imperforate baffle plate 16, which is secured at one end to the upper wall of the tank 15 as shown. The purpose of this baffle plate is to distribute the water entering the purifying tank through the pipe 13 and prevent it from falling directly to the bottom of the tank and agitating any sediment which may be there deposited. Located within the tank 15 and extending along the bottom thereof is a pipe 17, closed at one end and provided on its under side at regular intervals with openings 18. The opposite end of said pipe projects through the end of the tank at which the pipe 13 enters, the projecting end being screw-threaded to receive a nut 19, which engages in a screw-threaded aperture of a casting 20 secured on the end of the tank, whereby the pipe 17 is held in position.

The projecting end of the pipe 17 is secured in a coupling in the form of a T-connection 21, in which is also connected one end of a by-pass in the form of a pipe 22, the other end of which is connected with the coupling 12. The pipe 22 is provided with a valve 23. To the under side of the T coupling 21 is connected one end of a pipe 24 of a larger size than the pipe 22, which is provided with a blow-off valve 25 adapted to be opened and closed by a handle 26. Connecting with the boiler 1 through the bottom thereof is a pipe 27 which extends through the bottom of the tank 15, at the opposite end to that previously described, and has its outlet end located near the upper side of said tank. A baffle plate 28 is secured to the upper side of the tank 15 and extends downward below the upper end of the pipe 27, said baffle plate being located adjacent to said pipe and between it and the inlet end of the tank, or that at which pipe 15 enters. The pipe 27 is provided with a valve 29. Mounted on the upper side of the tank 15 is a vent pipe 30 provided with a valve 31, this valve being opened when the tank is initially being filled with water to permit the escape of air through the pipe 30, after which it is closed.

In Figure 2, I have shown a modified construction of mixing chamber. This comprises a casting 32 having a projecting portion 33 providing a passage 34 which connects with a throat 35 leading through the bottom of the casting. Projecting downward into the throat 35 is a tube 36, the lower end of the passage 37 of which opens into the throat 35 below the end of the passage 34. This device operates on the true injector principle, the water entering the boiler through the pipe 5, under pressure, of course, drawing in the hot water from the pipe 2 through the passage 34, the two streams mixing in the throat 35. In the use of this device, the feed pipe 5 will connect with the passage 37 and the pipe 2 with the passage 34. In the operation of the device as thus far described, the feed water entering through the pipe 5 and passing through the nozzle 6 and cup-shaped member 7 will cause hot water to be drawn through the pipe 2 and to be mixed with the incoming feed water. The waters so mixed, or combined, will pass through the pipe 13 and fall upon the baffle plate 16 and thus pass into the tank 15. As well known, the mixing of the hot water with the incoming cold feed water will cause the precipitation of foreign matter and impurities from the feed water, and these will be deposited on the bottom of the tank 15. At the upper side of the tank, the water will be substantially pure and will pass through the top of the pipe 27 into the boiler. The baffle plate 28 will tend to prevent the impurities and foreign matter suspended in the water from passing into the pipe 27. At intervals it is necessary to remove sediment from the tank. Various ways of accomplishing this may be provided, and in Figure 1, two such ways are possible with the construction illustrated.

In the operation of the boiler, when it is desired to clean out the openings 18 of pipe 17, this may be accomplished by closing the valve 14 and then opening valve 23 thereby allowing feed water and boiler water to pass through the pipe 22, coupling 21 and pipe 17. This water passes out through the openings 18 and agitates the sludge deposited in the bottom of the purifying tank; as the valve 29 is constantly opened this sludge overflows through pipe 27 and circulates around past the valve 29 and back through the bottom of the boiler; this circulation may be permitted for a short time after which, the valve 14 should be reopened and the valve 23 closed; at the same time blow-off valve 25 should be opened and valve 29 allowed to remain open. Water from the boiler will now pass into the purifying tank 15 through the valve 14 and also through the pipe 27, and the water within the purifying tank flows in through the openings 18 and along the pipe 17, passing out through coupling 21 and the blow-off valve 25.

Another way of cleaning out the purifying tank, while the boiler is in operation, is to close the valves 14 and 23 while valve 29 remains open, at the same time opening blow-off valve 25 for a short time. If this is done, boiler water under pressure will be forced out through the pipe 27 into the tank 15 and through the openings 18 into pipe 17, passing out through coupling 21 and through the blow-off valve 25 to the sewer.

Of course, when the boiler is shut down, access may be had to its interior through a hand hole opening 15$^a$ in the left head of the purifier, and by removing the handhole cover 38, any sludge in the boiler can be scraped up and allowed to fall through the opening at the handhole cover 38.

In Figure 3 I have shown a slightly different arrangement of the piping. In this arrangement the pipe 22 instead of connecting directly with the sediment pipe 17, is connected to a pipe 39 extending along the bottom of the purifying tank, and branch pipes 40 are connected at suitable intervals to the pipe 39 extend upward through the bottom of the purifying tank 15, and are there provided with couplings 41, to the opposite ends of which are connected pipe sections 42 provided with perforations 43 on the under side, in the same way as the pipe 18. This construction is designed where the purifying tank 15 is of considerable length and the use of a single pipe such as 17 would not be feasible. The pipe 39 and pipes 40 are connected by means of couplings 44 and below these couplings each of the pipes 40 is provided with a valve 45 which valves may be opened for cleaning sediment from the tank.

The construction shown in Figure 3 embodies also a rotary scraping device 46, which is mounted on a shaft 47 extending centrally through the tank, journaled in opposite ends thereof, and provided at one end with a crank arm 48 for rotating the scraper.

In order to locate the pipe sections 42 below the path of movement of the scraping device 46 I provide on the under side of the tank 15 an extension 49 extending through the length of the tank and forming a continuation thereof, the pipe sections 42 being located in this extension. In order to clear the shaft 47 I preferably lead the pipe 27 around the tank 15 and cause it to enter the tank at its upper side as shown at 50 in Figure 3.

The operation of the device is the same as that previously described except that in cleaning the tank the scraping device will be rotated to remove deposits from the wall of the tank.

I claim:

1. In a water purifier apparatus for steam boilers, the combination of a purifying tank, a mixing chamber, a pipe connected to the boiler below the water level therein and leading to said mixing chamber, a feed-water pipe also entering said mixing chamber, an inlet pipe leading from said mixing chamber and entering said tank at one end thereof, a pipe provided with perforations in its under side and extending along the bottom of said tank, a by-pass pipe leading from the inlet pipe and connected to said perforated pipe, a pipe and blow off valve connected with the by-pass pipe beyond the perforated pipe and a valved pipe connected to and extending through the bottom of the boiler, projecting into said purifying tank and having an open end located near the top thereof at the opposite end of said tank from that at which the inlet pipe enters.

2. In a water purifier apparatus for steam boilers, the combination of a purifying tank, a mixing chamber, a valved pipe connected to the boiler below the water level therein, and communicating with said mixing chamber, an injector device in said mixing chamber, a feed-water pipe connected with said injector device, an inlet pipe leading from said mixing chamber and entering said tank at one end thereof, a by-pass pipe leading from said inlet, a baffle plate located below the open end of said inlet pipe within the tank, a pipe provided with perforations on its under side and extending along the bottom of said tank, connected to said by-pass, a valved pipe connected to and extending through the bottom of the boiler, entering the end of said tank opposite said inlet and having an open end located at a high level in the tank and a baffle plate located adjacent to the open end of said pipe and between the same and said first-named baffle plate, and a blow off valve connected with said perforated pipe outside of the tank.

3. In a water purifying apparatus for steam boilers, the combination of a purifier tank, a feed water pipe, a mixing chamber connected therewith and connected with the boiler below the water line in the boiler, a connection including a valve for connecting the mixing chamber and the purifier tank, a sediment pipe located at the bottom of the purifier tank and having perforations, a by-pass connected to one end of said sediment pipe and connecting with the mixing chamber above said valve so as to lead water around the valve when the valve is closed, a valve in said by-pass, a blow-off valve connecting with the by-pass and the end of said sediment pipe, and a connection leading to the interior of the boiler including a valve, and communicating with the interior of the purifier at an elevated point therein.

4. In a water purifying apparatus for steam boilers, the combination of a purifier tank, a feed water pipe, a mixing chamber connected therewith and connected to the boiler below the water line in the boiler, a connection including a valve for connecting the mixing chamber and the purifier tank, a sediment pipe located at the bottom of the purifier tank and having perforations on its underside only, a by-pass connected to one end of said sediment pipe and connecting with the mixing chamber above said valve so as to lead water around the valve when the valve is closed, a valve in said by-pass, a blow-off valve connecting with said by-pass and the end of said sediment pipe, and a connection leading to the interior of the boiler including a valve, and communicating with the interior of the purifier at an elevated point therein.

In testimony whereof, I have hereunto set my hand.

EDWARD J. BROCK.